United States Patent
Sato et al.

(10) Patent No.: US 9,098,946 B2
(45) Date of Patent: Aug. 4, 2015

(54) IMAGE PROCESSING APPARATUS AND METHOD, SPECIFYING MARK ESTIMATING APPARATUS AND METHOD, AND NON-TRANSITORY COMPUTER READABLE MEDIUM

(75) Inventors: Koichi Sato, Kanagawa (JP); Ryoko Hashimoto, Kanagawa (JP); Mohit Jain, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 278 days.

(21) Appl. No.: 13/558,072

(22) Filed: Jul. 25, 2012

(65) Prior Publication Data
US 2013/0176605 A1 Jul. 11, 2013

(30) Foreign Application Priority Data
Jan. 6, 2012 (JP) ................................. 2012-001538

(51) Int. Cl.
*H04N 1/46* (2006.01)
*H04N 1/40* (2006.01)
*G06T 11/60* (2006.01)
*H04N 1/44* (2006.01)
*H04N 1/62* (2006.01)
*H04N 1/00* (2006.01)

(52) U.S. Cl.
CPC ................ *G06T 11/60* (2013.01); *H04N 1/448* (2013.01); *H04N 1/4446* (2013.01); *H04N 1/626* (2013.01); *H04N 1/00241* (2013.01); *H04N 2201/0081* (2013.01)

(58) Field of Classification Search
USPC ........ 358/1.1, 1.14, 1.15, 448, 474–498, 530, 358/538; 382/176, 229
See application file for complete search history.

(56) References Cited

U.S. PATENT DOCUMENTS 5,184,849 A * 2/1993 Taylor .............................. 283/67
5,666,191 A * 9/1997 Hasegawa et al. ............. 399/366
5,689,582 A * 11/1997 Murakami ...................... 382/176

(Continued)

FOREIGN PATENT DOCUMENTS

| JP | 07-203180 A | 8/1995 |
| JP | 10-091768 A | 4/1998 |
| JP | 2006-133960 A | 5/2006 |

OTHER PUBLICATIONS

Office Action issued by the Australian Patent Office in corresponding Australian Patent Application No. 2012209028, dated Jun. 24, 2013.

*Primary Examiner* — Allen H Nguyen
(74) *Attorney, Agent, or Firm* — Sughrue Mion, PLLC

(57) ABSTRACT

An image processing apparatus includes an estimating unit and a hiding unit. The estimating unit extracts a subject specifying mark image corresponding to a specifying mark from a recording area image corresponding to a recording area in which an image is recorded, plural predetermined types of specifying marks having predetermined attributes different from an attribute of the image of the recording area and being used for specifying a region within the recording area by using different specifying methods, at least one of the plural predetermined types of specifying marks being recorded in the recording area. The estimating unit estimates the type of specifying mark corresponding to the extracted subject specifying mark image. The hiding unit hides the region specified by the type of specifying mark estimated by the estimating unit by using a hiding method which is uniquely determined for the estimated type of specifying mark.

15 Claims, 16 Drawing Sheets

(56) References Cited

U.S. PATENT DOCUMENTS

| | | |
|---|---|---|
| 6,798,913 B2 * | 9/2004 | Toriyama ...................... 382/229 |
| 8,441,702 B2 * | 5/2013 | Do et al. ....................... 358/538 |
| 2005/0002053 A1 * | 1/2005 | Meador et al. ................ 358/1.14 |
| 2008/0144131 A1 * | 6/2008 | Jung et al. ..................... 358/474 |
| 2008/0239365 A1 * | 10/2008 | Salgado et al. .............. 358/1.15 |
| 2011/0122458 A1 | 5/2011 | Do et al. |

\* cited by examiner

FIG. 6

SEGMENT MARK (SPECIFYING MARK)

FIG. 7

CURVED FRAME MARK (SPECIFYING MARK)

POLYGONAL FRAME MARK (SPECIFYING MARK)

IDENTIFICATION MARK

FIG. 9

OBLIQUE LINE MARK (SPECIFYING MARK)

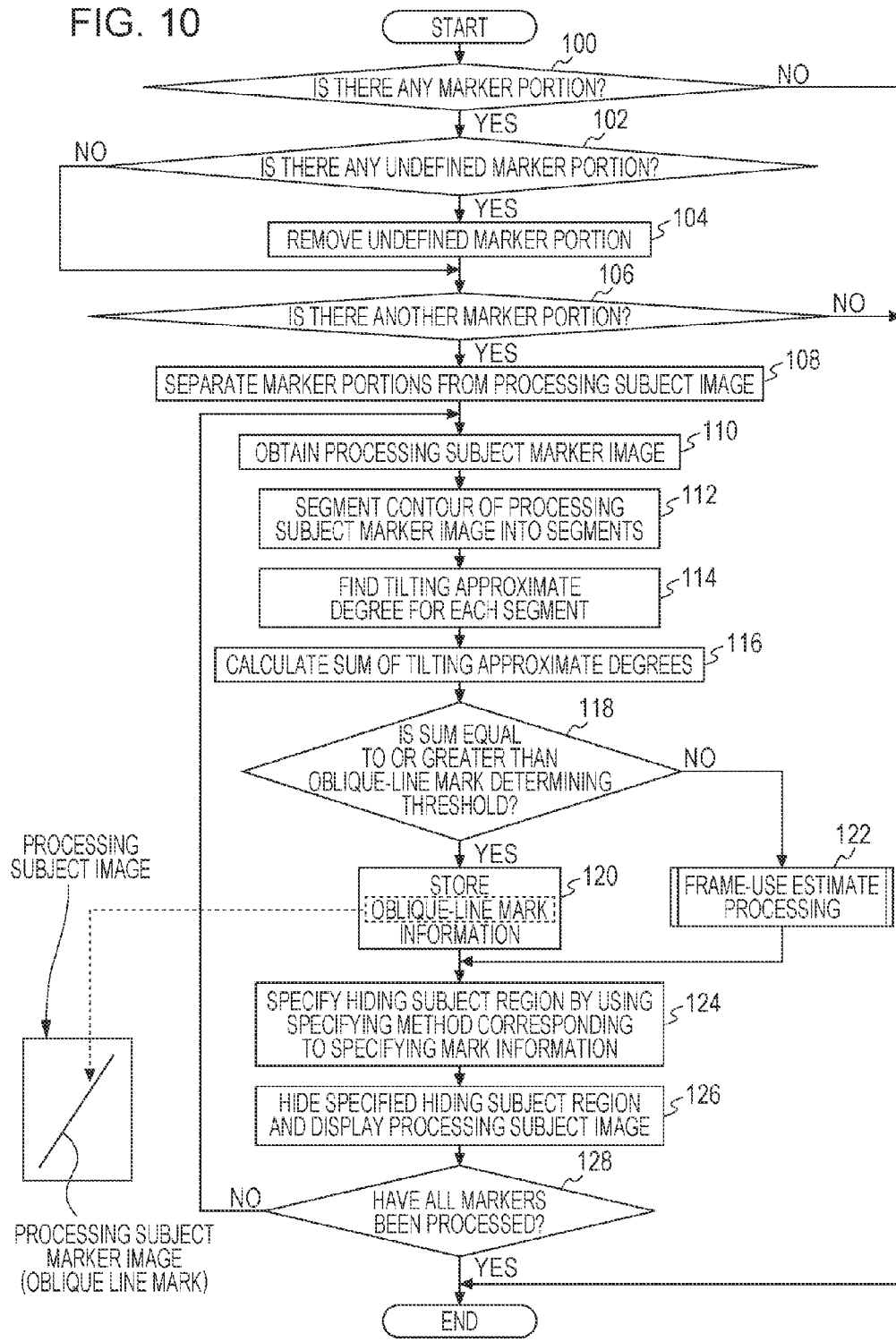

IMAGE PROCESSING APPARATUS AND METHOD, SPECIFYING MARK ESTIMATING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-001538 filed Jan. 6, 2012.

BACKGROUND

Technical Field

The present invention relates to an image processing apparatus and method, a specifying mark estimating apparatus and method, and a non-transitory computer readable medium.

SUMMARY

According to an aspect of the invention, there is provided an image processing apparatus including an estimating unit and a hiding unit. The estimating unit extracts a subject specifying mark image corresponding to a specifying mark from a recording area image corresponding to a recording area in which an image is recorded, plural predetermined types of specifying marks having predetermined attributes different from an attribute of the image of the recording area and being used for specifying a region within the recording area by using different specifying methods, at least one of the plural predetermined types of specifying marks being recorded in the recording area. The estimating unit estimates the type of specifying mark corresponding to the extracted subject specifying mark image. The hiding unit hides the region specified by the type of specifying mark estimated by the estimating unit by using a hiding method which is uniquely determined for the estimated type of specifying mark.

BRIEF DESCRIPTION OF THE DRAWINGS

Exemplary embodiments of the present invention will be described in detail based on the following figures, wherein:

FIGS. 6 through 9 illustrate specifying methods used for executing hiding processing by using the image processing apparatus of the first exemplary embodiment;

FIG. 10 is a flowchart illustrating an example of the flow of processing of a hiding processing program according to the first exemplary embodiment;

FIG. 16 illustrates an example in which a hiding subject region specified by the specifying method shown in FIG. 6 is hidden;

FIG. 17 illustrates an example in which a hiding subject region specified by the specifying method shown in FIG. 8 is hidden;

DETAILED DESCRIPTION

Exemplary embodiments of the present invention will be described below in detail with reference to the accompanying drawings.

First Exemplary Embodiment

Figure 1:
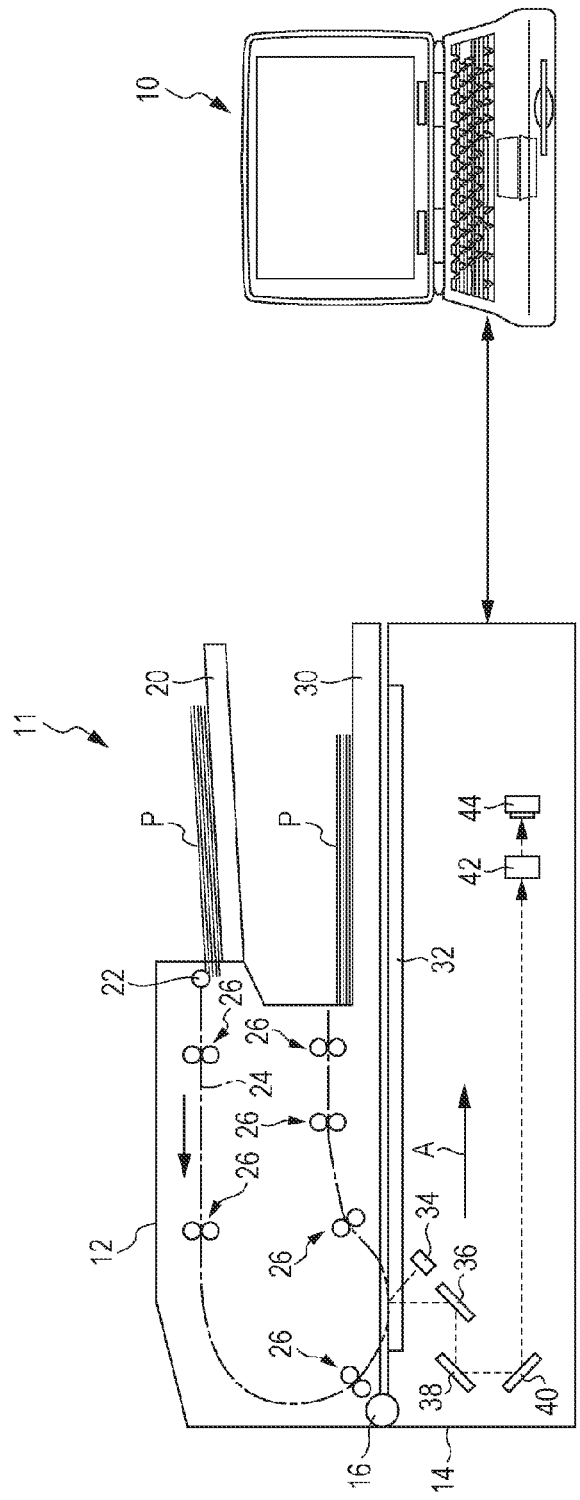
FIG. 1 illustrates an image processing apparatus connected to an image reading apparatus according to a first exemplary embodiment.

FIG. 1 illustrates an image processing apparatus 10 according to a first exemplary embodiment. In the first exemplary embodiment, a personal computer (PC) is used as the image processing apparatus 10. However, the image processing apparatus 10 is not restricted to a PC, and may be a microcomputer. Any apparatus may be used as the image processing apparatus 10 as long as it includes a computer which is capable of executing a hiding processing program, which will be discussed later.

As shown in FIG. 1, an image reading apparatus 11 is connected to the image processing apparatus 10. The image reading apparatus 11 includes a document transport unit 12 and an image reader 14. The document transport unit 12 and the image reader 14 are connected with an interconnecting unit 16 therebetween. The document transport unit 12 is rotatable in a direction close to or away from the image reader 14 with respect to the interconnecting unit 16. When the document transport unit 12 is rotated in the direction away from the image reader 14, platen glass 32, which will be discussed later, is exposed.

The document transport unit 12 includes a document table 20 on which documents P having images recorded in recording areas of the documents P are placed. The documents P placed on the document table 20 are extracted one by one by an extracting roller 22 and are transported along a transport path 24. The document P is then transported, by a pair of transport rollers 26, to a document reading position at which an image formed on the document P is read by the image reader 14, and the image recorded on one side of the document P is read by the image reader 14. The document P is then discharged to a discharge unit 30 installed on the farther downstream side in the transport direction than the document reading position.

The image reader 14 includes the platen glass 32, which is transparent, on the top surface of which the document P is placed. The above-described document reading position is located on the top surface of the platen glass 32. At a position below the platen glass 32 corresponding to the document reading position, a light source 34, a first reflection mirror 36, a second reflection mirror 38, and a third reflection mirror 40 are disposed. The light source 34 irradiates the surface of the document P with illuminating light. The first reflection mirror 36 receives light reflected by the surface of the document P. The second reflection mirror 38 deflects the traveling direction of reflected light emitted from the first reflection mirror 36. The third reflection mirror 40 further deflects the traveling direction of the reflected light emitted from the second reflection mirror 38 in another direction.

The image reader 14 also includes a lens 42 and a light detector 44 which is provided with plural photoelectric conversion sensors aligned on a light receiving surface of the light detector 44. The image reader 14 forms an image from the reflected light emitted from the third reflection mirror 40 on the light receiving surface of the light detector 44 by using the lens 42. In this manner, the image reader 14 reads the image recorded on the surface of the document P by dividing the image into plural pixels and also dividing the pixels into red (R), green (G), and blue (B) color components by using the light detector 44.

In the first exemplary embodiment, as the light source 34, a fluorescent lamp is used. However, this is only an example, and another light source, such as plural light emitting diodes (LEDs) aligned along a direction intersecting with the transport direction of the document P may be used. In the first exemplary embodiment, as the light detector 44, a charge coupled device (CCD) line sensor is used. However, this is only an example, and another solid-state imaging element, such as a complementary metal-oxide semiconductor (CMOS) image sensor, may be used.

In the image reading apparatus 11 of the first exemplary embodiment, the light source 34, the first reflection mirror 36, the second reflection mirror 38, and third reflection mirror 40 are moved in the direction indicated by arrow A (and the direction opposite to the direction A). With this configuration, when the document P is placed on the top surface of the platen glass 32, which is exposed as a result of rotating the document transport unit 12 in the direction away from the image reader 14, the light source 34 and the first, second, and third reflection mirrors 36, 38, and 40 are moved in the direction indicated by arrow A while irradiating the document P with illuminating light emitted from the light source 34. Then, the image recorded in a recording area, which is the surface of the document P (the surface in contact with the top surface of the platen glass 32), is read. In this case, both the image and the recording area are read, in other words, the entire surface of the document P is read.

Figure 2:
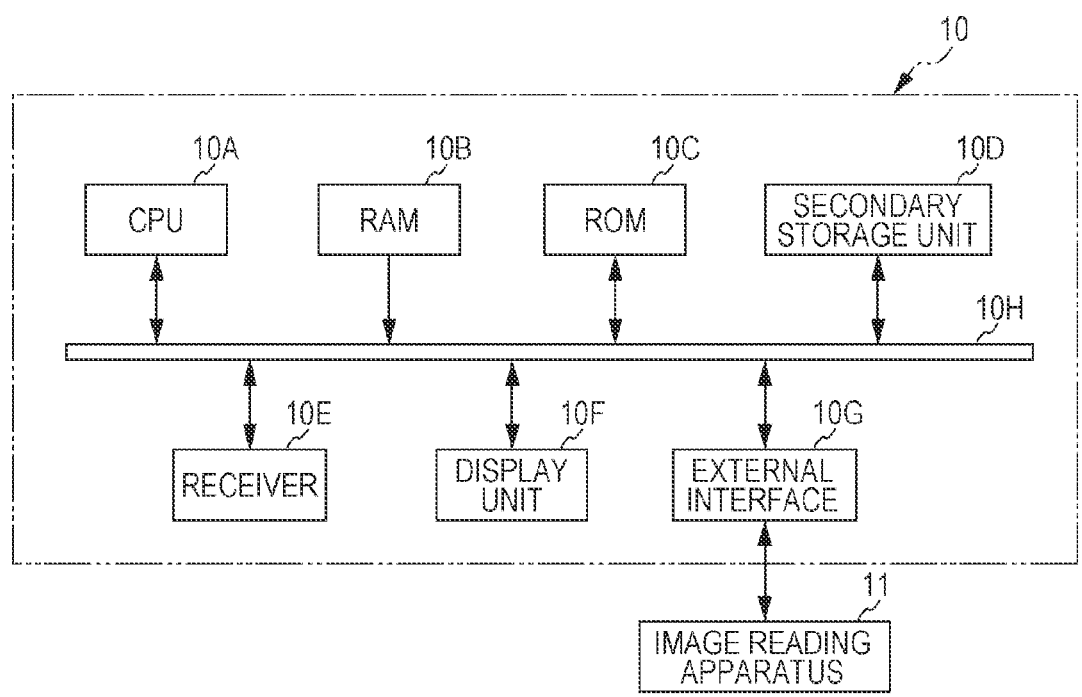
FIG. 2 illustrates an example of the major components of the electrical configuration of the image processing apparatus according to the first exemplary embodiment.

FIG. 2 illustrates an example of the major components of the electrical configuration of the image processing apparatus 10 according to the first exemplary embodiment. The image processing apparatus 10 includes, as shown in FIG. 2, a central processing unit (CPU) 10A, a random access memory (RAM) 10B, a read only memory (ROM) 10C, a secondary storage unit 10D, a receiver 10E, a display unit 10F, and an external interface 10G. The CPU 10A controls the entire operation of the image processing apparatus 10. The RAM 10B is used as a work area when the CPU 10A executes various processing programs. The ROM 10C stores therein various control programs, various parameters, etc. The secondary storage unit 10D is, for example, a hard disk drive, and serves as a storage device for storing various items of information. The receiver 10E is, for example, a mouse or a keyboard, and receives various items of information. The display unit 10F is, for example, a liquid crystal display, and displays various items of information. The external interface 10G is connected to an external device, such as a printer (image forming apparatus), a PC, or the image reading apparatus 11, and sends image information to the external device and sends and receives various items of information to and from the external device. In the example shown in FIG. 2, the external interface 10G is connected to the image reading apparatus 11 by way of example. The above-described elements are electrically connected to one another via a bus 10H, such as an address bus, a data bus, or a control bus.

Accordingly, the CPU 10A accesses the RAM 10B, the ROM 10C, and the secondary storage unit 10D, obtains various items of information received via the receiver 10E, displays various items of information on the display unit 10F, and receives and sends various items of information to and from the image reading apparatus 11 via the external interface 10G.

The image processing apparatus 10 configured as described above has functions of executing various types of processing operations on image information representing an image recorded in a recording area of a document P. One of the functions is a hiding processing function of performing hiding processing on a specified region to be hidden within an image represented by image information input from the image reading apparatus 11 (hereinafter such a region is referred to as a "hiding subject region"). The term "hide" or "hiding" refers to filling a hiding subject region with a specific color so as to prevent the hiding subject region from being viewed, or to superposing a pattern or a picture that allows a hiding subject region to be partially viewed.

Figure 3:
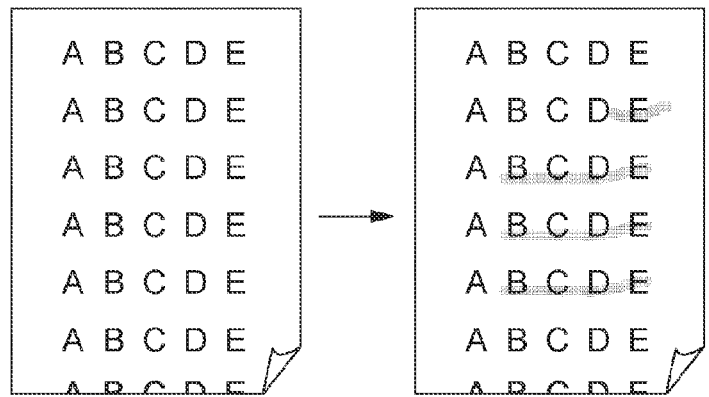
FIGS. 3 through 5 schematically illustrate known specifying methods for hiding subject regions.
Figure 4:
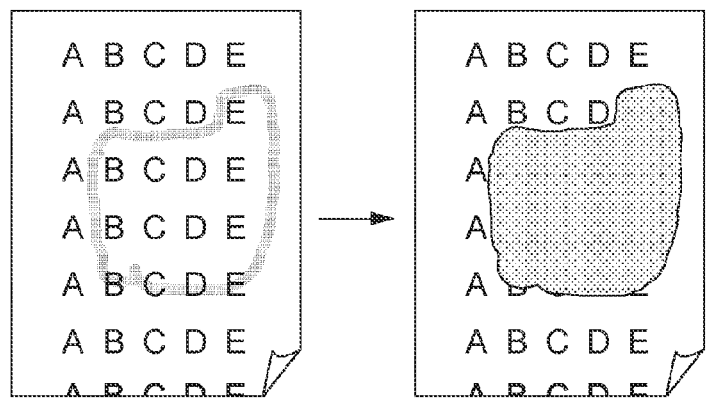
Figure 5:
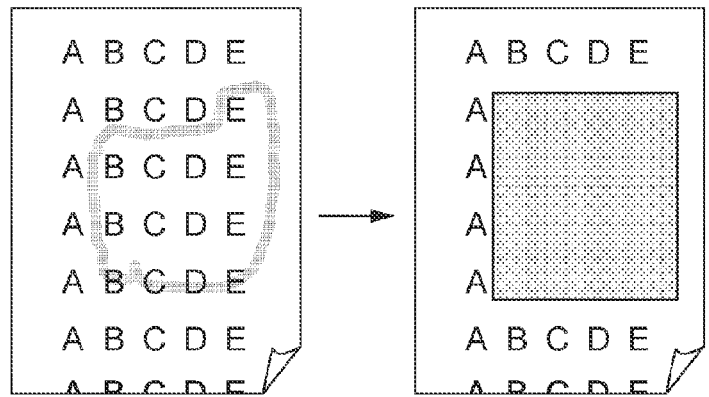

Before starting the hiding processing function, it is necessary to first specify a hiding subject region within an image recorded in the recording area of the document P. There are different approaches to specifying a hiding subject region. Among others, specifying methods shown in FIGS. 3 through 5 are known. In the method shown in FIG. 3, a hiding subject region is specified by a segment mark. In this method, however, if a hiding subject region is constituted by several lines, it is necessary to record segment marks for several lines. If a hiding subject region is constituted by several hundreds of lines or several thousands of lines, it takes considerable time and effort to record segment marks. In the method shown in FIG. 4, a polygonal frame mark (hereinafter may be referred to as a "polygon mark") is used. A region surrounded by a polygon mark is specified as a hiding subject region, and the entire region within the polygon mark is hidden as a result of filling the entire region with a solid color, as shown in FIG. 4. In the method using a polygon mark, it may take less time and effort to specify a hiding subject region than the method using a segment mark. On the other hand, however, a portion which is not supposed to be included in a hiding subject region may be unintentionally included. In the method shown in FIG. 5, the entire region within a rectangular frame including a region surrounded by a polygon mark is specified as a hiding subject region. In this method, as in the method shown in FIG. 4, an unintended region may also be included in a hiding subject region and be hidden.

In contrast, by using the image processing apparatus 10, a user first specifies a specifying method from among plural predetermined hiding-subject-region specifying methods in which hiding subject regions are hidden in different ways, and then specifies a hiding subject region from an image (hereinafter referred to as a "hiding subject image") included in a recording area of the document P by using the specifying method specified by the user. That is, a hiding subject region is specified by selectively recording one of plural types of predetermined specifying marks, which are associated with different specifying methods, in a recording area of the document P. Then, by using the hiding processing function, the image processing apparatus 10 hides the hiding subject region specified by the user by using the hiding method which is uniquely determined for the recorded specifying mark.

Figure 24:
FIGS. 24 through 26 illustrate examples of noise elimination methods for specifying mark images according to an exemplary embodiment.
Figure 25:
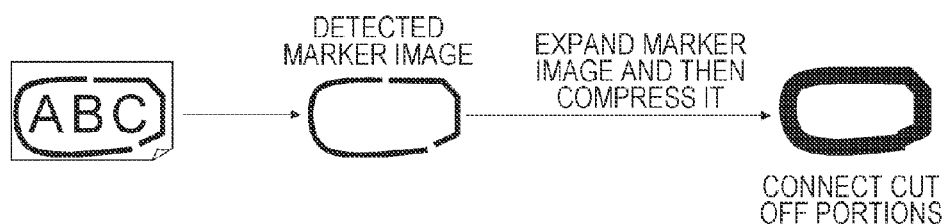
Figure 26:
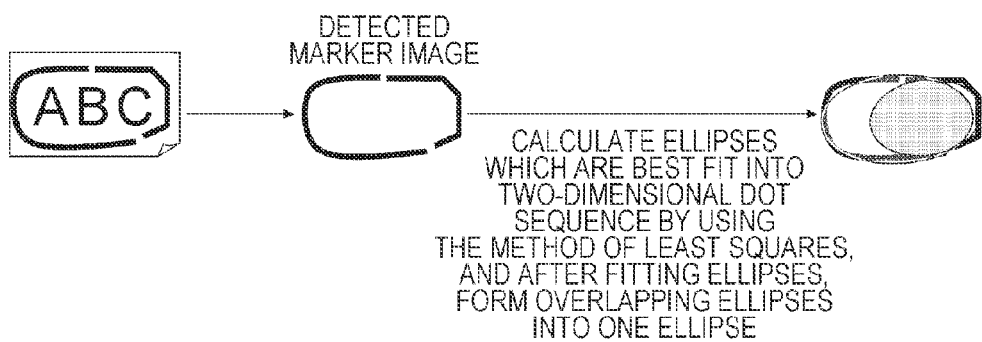

Examples of the above-described plural types of predetermined specifying marks are different segment images, each being formed continuously in a specific color (e.g., black), and, more specifically, specifying marks shown in FIGS. 6 through 9. The reason for using continuous segment images is because continuous segment images can be specified more simply and precisely as specifying marks than discontinuous segment images. However, if a specifying mark is recorded on character images, an image representing a marker (marker image) may become discontinuous, as shown in FIG. 24. In this case, if adjacent marker images are the same color (e.g., black), they are filled with that color (noise elimination) so that they are shaped into a continuous marker image (segment image). Additionally, when a frame-like specifying mark (an elliptical specifying mark in this case) is used, as shown in FIG. 25, the marker image may be cut off due to faint streaking, noise, or the way in which the marker has been recorded. In this case, the marker image is expanded so as to connect cut off portions to each other. In another shaping method (noise elimination method), as shown in FIG. 26, ellipses which are best fit into a two-dimensional dot sequence of a marker image are calculated by using the method of least squares, and after fitting the ellipses into the two-dimensional dot sequence, overlapping ellipses are formed into one ellipse.

All of the specifying marks shown in FIGS. 6 through 9 have attributes different from those of other images recorded in a recording area. In the examples of the specifying marks shown in FIGS. 6 through 9, images other than the specifying marks are images recorded in an achromatic color (e.g., black) material. Concerning the specifying marks, when they are recorded on the other images, the other images disappear, leaving the specifying marks visible. The specifying marks are recorded as thick-line images by using a writing instrument (e.g., a highlighter pen) that applies a chromatic color (e.g., florescent pink) material recognized by the image reading apparatus 11. A description will be given below, assuming that the base color of the document P is white, an image which is to be a hiding subject image is recorded in a black color material on the recording area of the white document P, and a specifying mark is recorded in the recording area of the document P by using a highlighter marker (hereinafter simply referred to as a "marker").

Figures 6, 7:
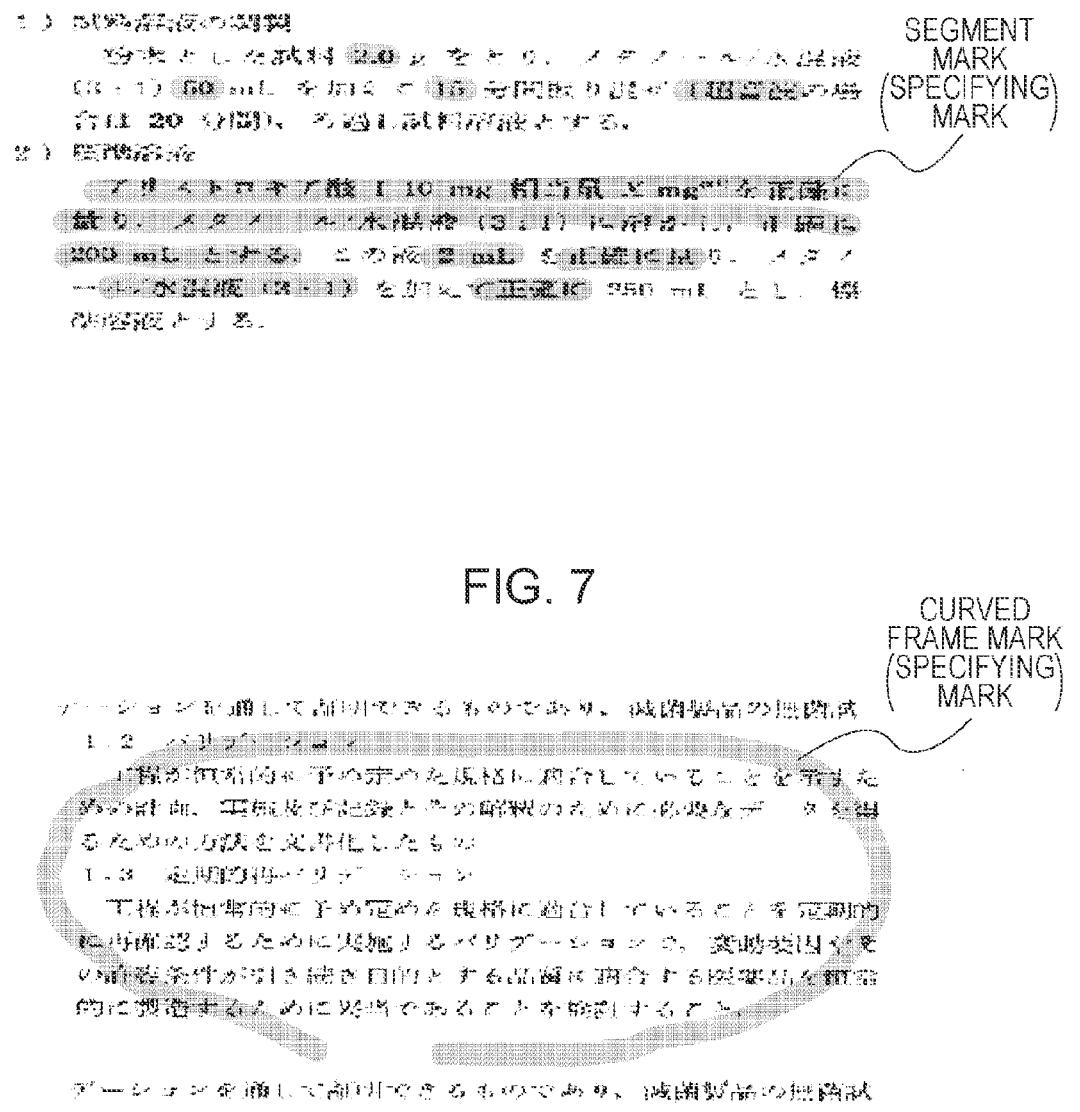

The specifying mark shown in FIG. 6 is a segment mark that specifies, as a hiding subject region, a region (in this case, the entire region) contained in a circumscribed rectangular frame, which is formed for a region included as a result of recording the specifying mark on a hiding subject image. The specifying mark shown in FIG. 7 is a curved frame mark that specifies, as a hiding subject region, a region (in this case, the entire region) contained in a circumscribed rectangular frame, which is formed for a region surrounded as a result of recording the specifying mark on a hiding subject image. In the first exemplary embodiment, concerning a curved frame mark, the region within a circumscribed rectangular frame formed for a curved frame mark is specified as a hiding subject region. However, the region within an inscribed rectangular frame formed for a curved frame mark may be specified as a hiding subject region.

The specifying mark shown in FIG. 8 is a polygonal frame mark that specifies, as a hiding subject region, a region (in this case, the entire region) surrounded as a result of recording the specifying mark on a hiding subject image. Inside the polygonal frame mark, an identification mark (in this case, an oblique line) indicating that this specifying mark is different from the other specifying marks is contained. The specifying mark shown in FIG. 9 is an oblique line, which serves as one of a pair of diagonal lines that define a rectangular frame (broken-line rectangular frame shown in FIG. 9) that specifies, as a hiding subject region, a region (in this case, the entire region) contained in a region surrounded as a result of recording the specifying mark on a hiding subject image. The oblique line is tilted with respect to a reference line, which will be discussed later, within a predetermined tilting range (e.g., 45°±5°, 135°±5°). Such an oblique line used as a specifying mark will be hereinafter referred to as an "oblique line mark".

In the image processing apparatus 10 of the first exemplary embodiment, various processing operations implementing the hiding processing function are executed by using software. For example, a program for the processing operations may be executed by using a computer. However, the processing operations implementing the hiding processing function may be executed in another manner. For example, hardware may be utilized or a combination of hardware and software may be utilized.

In the following description, the hiding processing function is implemented as a result of the CPU 10A of the image processing apparatus 10 executing a hiding processing program. In this case, the hiding processing program may be stored in the secondary storage unit 10D in advance, or may be stored in a recording medium, in which case, the content of the program is read from the recording medium by using a computer. Alternatively, the program may be distributed via a wired or wireless communication medium.

FIG. 10 is a flowchart illustrating an example of the flow of processing of the hiding processing program according to the first exemplary embodiment. In the following description, in order to avoid the complexity, the following type of image information read from the image reading apparatus 11 to the image processing apparatus 10 is subjected to hiding processing. Image information represents an image which is recorded in a black color material and which is recorded in the entire recording area of a white document P (such an image will be referred to as a "recording area image"). Hereinafter, such image information will be referred to as "processing subject image information".

In FIG. 10, in step 100, it is determined whether there is a portion recorded with a marker (marker portion) within an image in a recording area (hereinafter such an image will be referred to as a "processing subject image") represented by the processing subject image information. If the result of step 100 is NO, the hiding processing program is terminated. If the result of step 100 is YES, the process proceeds to step 102. In step 100, the presence of a marker portion is determined on the basis of the attributes of a marker and the attributes of images recorded in the recording area, which are other than the marker (in this case, on the basis of a difference in the color between the marker and the other images).

In step 102, it is determined whether there is a marker portion (undefined marker portion) which is not identified as a marker portion indicating a specifying mark within the processing subject image. The undefined marker portion is, for example, a marker portion which is not identified as a continuous segment image. In this case, a marker portion, which is an assembly of pixels, a marker portion or a contour line of one pixel having a length less than (the width of the document P+the size of the document P)/512, is considered as an undefined marker portion. If the result of step 102 is YES, the process proceeds to step 104. If the result of step 102 is NO, the process proceeds to step 106.

In step 104, an undefined marker portion is removed from the processing subject image, and then, the process proceeds to step 106. In step 106, it is determined whether there is another marker portion in the processing subject image. If the result of step 106 is NO, the hiding processing program is terminated. If the result of step 106 is YES, the process proceeds to step 108. In step 108, the marker portions are extracted from the processing subject image on the basis of the attributes of the marker (in this case, on the basis of a difference in the attributes between the marker and images recorded in the recording area other than the marker, and more specifically, on the basis of whether or not the color is black), thereby separating the marker portions from the processing subject image. The process then proceeds to step 110.

In step 110, an image representing one continuous marker portion (hereinafter referred to as a "processing subject marker image") is obtained from the marker portions separated from the processing subject image in step 108. Then, in step 112, a line corresponding to the contour of the processing subject marker image obtained in step 110 (in this case, a contour line) is segmented in predetermined segmentation units (e.g., a segmentation unit corresponding to a length of (the width of the document P+the size of the document P)/512). Then, the process proceeds to step 114.

Figure 11:
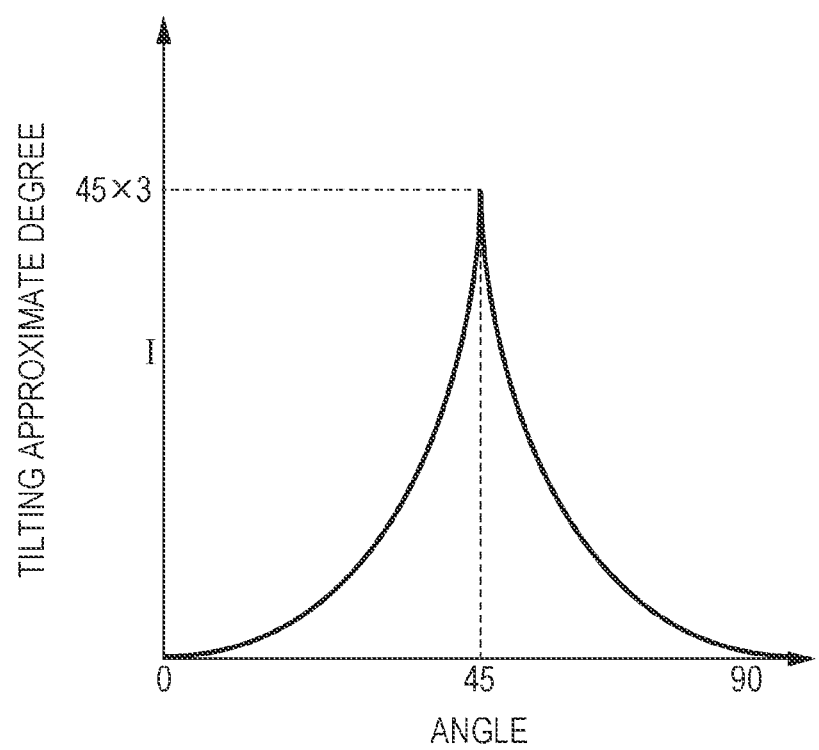
FIG. 11 shows an example of a graph for finding a tilting approximate degree according to the first exemplary embodiment.

In step 114, concerning each of the segments obtained as a result of being segmented from the processing subject marker image in step 112, an approximate value between the angle of each of the segments with respect to a reference line for segments (in this case, a horizontal line) and the angle of a reference tilting line (in this case, a straight line tilting at 45 degrees with respect to the horizontal line) with respect to the reference line is found. Hereinafter such an approximate value will be referred to as a "tilting approximate degree". In step 114, for example, the tilting approximate degree is found by using a tilting approximate degree graph shown in FIG. 11. In this graph, the horizontal axis indicates the angle from 0 to 90 degrees with respect to the reference line, and the vertical axis designates the tilting approximate degree, which is a value obtained by multiplying the angle indicated by the horizontal axis by three. More specifically, in the tilting approximate degree graph, when the angle is 0 or 90 degrees on the horizontal axis, the tilting approximate degree on the vertical axis is minimized (45×0=0). When the angle is 45 degrees on the horizontal axis, the tilting approximate degree on the vertical axis is maximized (45×3=135). That is, the tilting approximate degree increases and decreases line-symmetrically with respect to the angle of 45 degrees. More specifically, the tilting approximate degree sharply increases from 0 to 45 degrees, while the tilting approximate degree sharply decreases from 45 to 90 degrees. Accordingly, as the angle with respect to the reference line for segments approximates 45 degrees more closely, the tilting approximate degree becomes larger. Although in the graph shown in FIG. 11 the maximum value of the tilting approximate degree on the vertical axis is set as 45×3, it may be set as 45×4 or 45×5. The maximum value of the tilting approximate degree may be set as any value as long as the tilting approximate degree sharply and line-symmetrically increases and decreases with respect to 45 degrees in a range from 0 to 180 degrees on the horizontal axis.

Then, in step 116, the sum of the tilting approximate degrees of the individual segments obtained in step 114 is calculated. The process then proceeds to step 118. In step 118, it is determined whether the sum calculated in step 116 is equal to or greater than an oblique-line mark determining threshold. If the result of step 118 is YES, it means that the processing subject marker image obtained in step 110 corresponds to an oblique line mark, and the process proceeds to step 120. If the result of step 118 is NO, it means that the processing subject marker image obtained in step 110 corresponds to a specifying mark other than an oblique line mark, and the process proceeds to step 122. The oblique-line mark determining threshold is determined in advance in the following manner by conducting experiment or simulations. Concerning each of various oblique line marks, the sum of tilting approximate degrees of individual segments obtained as a result of being segmented from an oblique line mark with predetermined segmentation units is calculated. Then, the lowest value of the sums which can be identified as an oblique line mark is set as the oblique-line mark determining threshold. The oblique-line mark determining threshold may be changed in response to an instruction received from a user of the image processing apparatus 10 via the receiver 10E, or may be a fixed value which is not changed in response to an instruction.

In step 120, oblique-line mark information indicating that the processing subject marker image obtained in step 110 is an oblique line mark is stored in a predetermined storage area of the RAM 10B. The process then proceeds to step 124.

Figure 12:
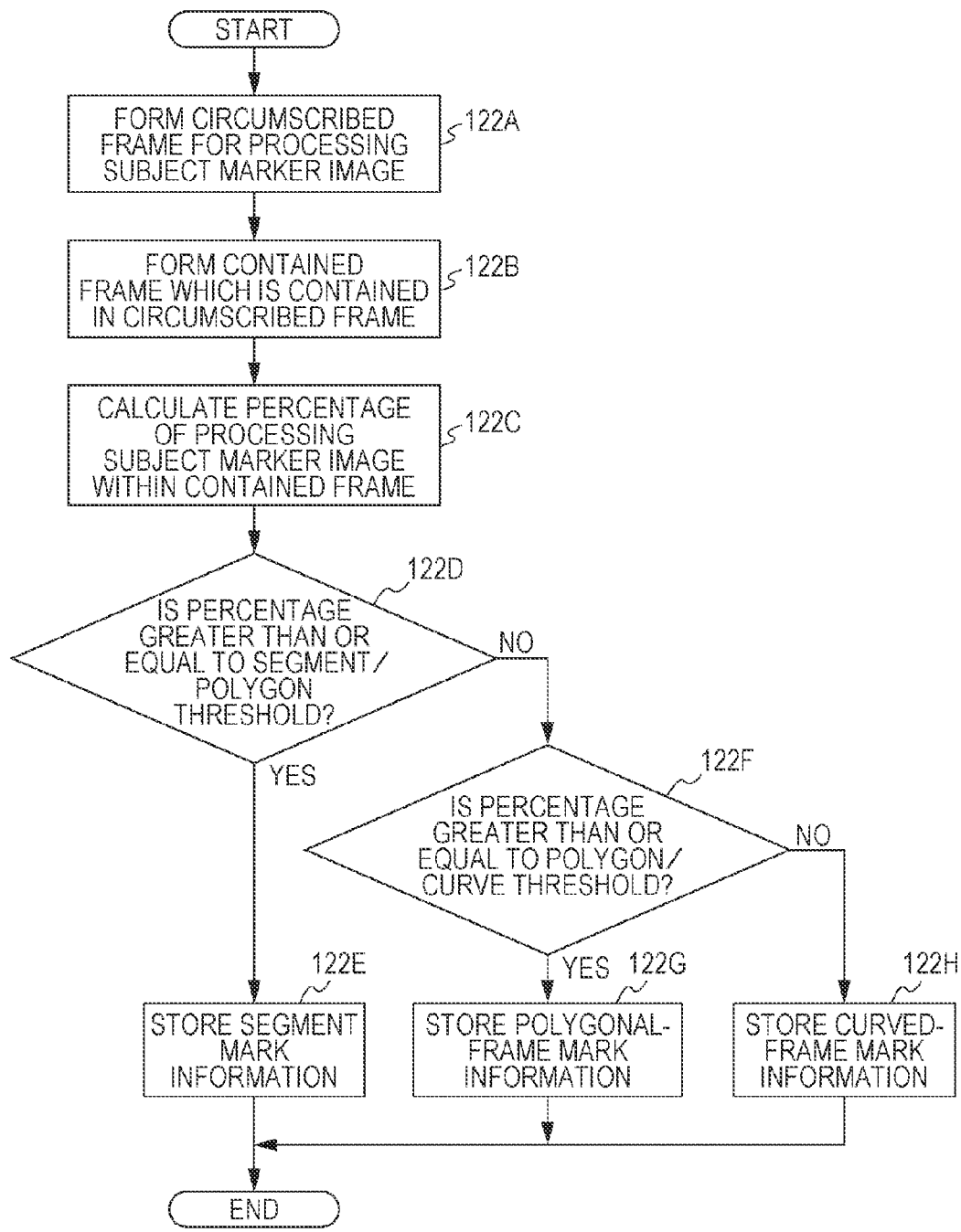
FIG. 12 is a flowchart illustrating an example of the flow of processing of a frame-use estimate processing program according to the first exemplary embodiment.

In step 122, frame-use estimate processing is performed for estimating, by using a frame, the type of specifying mark, which is other than an oblique line mark, of the processing subject marker image obtained in step 110. The process then proceeds to step 124. This frame-use estimate processing is implemented as a result of the CPU 10A executing a frame-use estimate processing program. FIG. 12 is a flowchart illustrating an example of the flow of processing of the frame-use estimate processing program.

Figure 13:
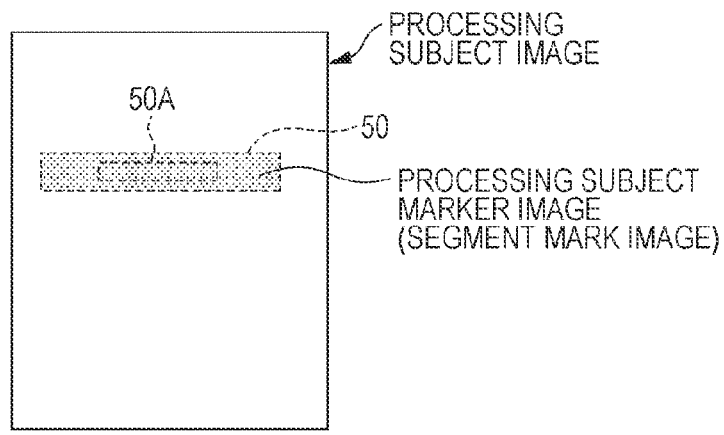
FIGS. 13 through 15 schematically illustrate examples of a circumscribed frame and a contained frame formed for a specifying mark which is used for executing hiding processing by using the image processing apparatus of the first exemplary embodiment.
Figure 14:
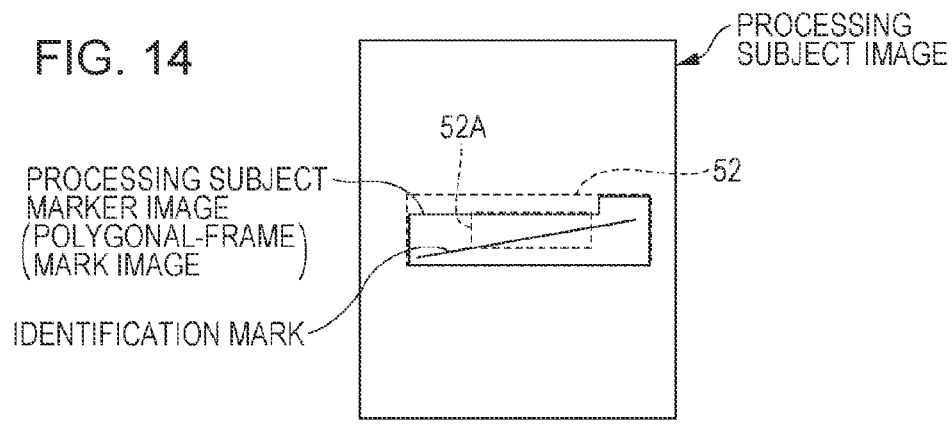
Figure 15:
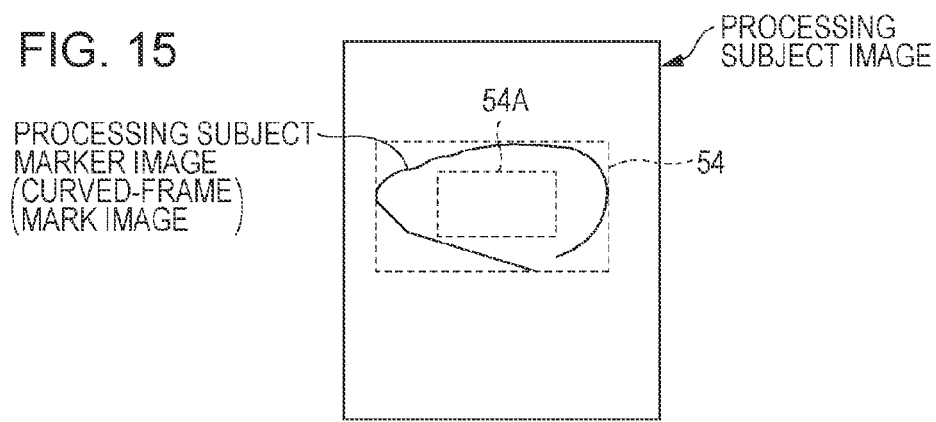

In FIG. 12, in step 122A, a circumscribed frame is formed for the processing subject marker image obtained in step 110. The process then proceeds to step 122B. In the first exemplary embodiment, as a result of step 122A, a circumscribed rectangular frame 50 shown in FIG. 13 is formed for a processing subject marker image corresponding to a segment mark, a circumscribed rectangular frame 52 shown in FIG. 14 is formed for a processing subject marker image corresponding to a polygonal frame mark, and a circumscribed rectangular frame 54 shown in FIG. 15 is formed for a processing subject marker image corresponding to a curved frame mark. However, the circumscribed rectangular frames 50, 52, and 54 are only examples, and a circumscribed curved shape or a polygonal frame other than a rectangular frame may be formed.

In step 122B, a contained frame which is uniquely determined for the circumscribed frame formed in step 122A and which is contained in the circumscribed frame without contacting the circumscribed frame is formed. The process then proceeds to step 122C. The phrase "without contacting the circumscribed frame" means that the contained frame does not contact the internal contour of the circumscribed frame. In the first exemplary embodiment, as a result of executing step 122B, as an example of the contained frame for the circumscribed rectangular frame 50, a rectangular frame 50A shown in FIG. 13 is formed at a predetermined position (e.g., at a central portion of a region which is positioned inside the circumscribed rectangular frame 50 which is not in contact with the internal contour of the circumscribed rectangular frame 50). As an example of the contained frame for the circumscribed rectangular frame 52, a rectangular frame 52A shown in FIG. 14 is formed at a predetermined position (e.g., at a central portion of a region which is positioned inside the circumscribed rectangular frame 52 and which is not in contact with the internal contour of the circumscribed rectangular frame 52). As an example of the contained frame for the circumscribed rectangular frame 54, a rectangular frame 54A shown in FIG. 15 is formed at a predetermined position (e.g., at a central position of a region which is positioned inside the circumscribed rectangular frame 54 and which is not in contact with the internal contour of the circumscribed rectangular frame 54). The term "central portion" specifies a region of a contained frame when the center of a circumscribed frame overlaps the center of the contained frame. Although the rectangular frames 50A, 52A, and 54A are shown as contained frames, the contained frames may be a curved shape or a polygonal frame other than a rectangular frame. Additionally, in the first exemplary embodiment, a contained frame is obtained by reducing the size of a circumscribed frame by half. However, a contained frame may be formed in any manner as long as it is not in contact with the internal contour of a circumscribed frame and is determined with a certain rule (e.g., a contained frame obtained by reducing a circumscribed frame with a reduction ratio of 50% in the vertical direction and a reduction ratio of 30% in the horizontal direction, a contained frame obtained by reducing the size of an inscribed curved shape set for a circumscribed frame by half, or a contained frame which is offset from a circumscribed frame toward the inside of the circumscribed frame by a predetermined distance).

In step 122C, the percentage of the processing subject marker image obtained in step 110 in the contained frame formed in step 122B is calculated. Then, in step 122D, it is determined whether the percentage calculated in step 122C is equal to or greater than a segment/polygon threshold. If the result of step 122D is YES, it means that it is estimated that the processing subject marker image obtained in step 110 is a segment mark, and the process proceeds to step 122E. The segment/polygon threshold is determined in advance in the following manner. Concerning samples of various segment marks (e.g., 1000 segment marks randomly sampled from 10000 or more segment marks) and samples of various polygonal frame marks (e.g., 1000 polygonal frame marks randomly sampled from more than 10000 polygonal frame marks), the boundary value between a value which is recognized as a segment mark and a value which is recognized as a polygonal frame mark is determined as the segment/polygon threshold by conducting experiment or simulations. In the first exemplary embodiment, the segment/polygon threshold is set to be 50%. However, the segment/polygon threshold may be set to be any percentage as long as it is greater than a polygon/curve threshold, which will be discussed below.

In step 122E, segment mark information indicating that the processing subject marker image obtained in step 110 is an image corresponding to a segment mark is stored in a predetermined storage area of the RAM 10B. Then, the frame-use estimate processing program is completed.

If the result of step 122D is NO, it means that it is estimated that the processing subject marker image obtained in step 110 is an image corresponding to a polygonal frame mark or a curved frame mark, and the process proceeds to step 122F. In step 122F, it is determined whether the percentage of the processing subject marker image obtained in step 110 in the contained frame formed in step 122B is equal to or greater than the polygon/curve threshold. If the result of step 122F is YES, it means that it is estimated that the processing subject marker image obtained in step 110 is an image corresponding to a polygonal frame mark, and the process proceeds to step 122G. The polygon/curve threshold is determined in advance in the following manner. Concerning samples of various polygonal frame marks (e.g., 1000 polygonal frame marks randomly sampled from 10000 or more polygonal frame marks) and samples of various curved frame marks (e.g., 1000 curved frame marks randomly sampled from 10000 or more curved frame marks), the boundary value between a value which is recognized as a polygonal frame mark and a value which is recognized as a curved frame mark is determined as the polygon/curve threshold by conducting experiment or simulations. In the first exemplary embodiment, the polygon/curve threshold is set to be 2.5%. However, the polygon/curve threshold may be set to be any percentage as long as it is smaller than the above-described segment/polygon threshold.

In step 122G, polygonal-frame mark information indicating that the processing subject marker image obtained in step 110 is an image corresponding to a polygonal frame mark is stored in a predetermined storage area of the RAM 10B. Then, the frame-use estimate processing program is completed.

If the result of step 122F is NO, it means that it is estimated that the processing subject marker image obtained in step 110 is an image corresponding to a curved frame mark, and the process proceeds to step 122H. In step 122H, curved-frame mark information indicating that the processing subject marker image obtained in step 110 is an image corresponding to a curved frame mark is stored in a predetermined storage area of the RAM 10B. Then, the frame-use estimate processing program is completed. For the sake of the simplicity of description, if it is not necessary to distinguish among oblique-line mark information, segment mark information, polygonal-frame mark information, and curved-frame mark information, they will be hereinafter referred to as "specifying mark information".

Figure 18:
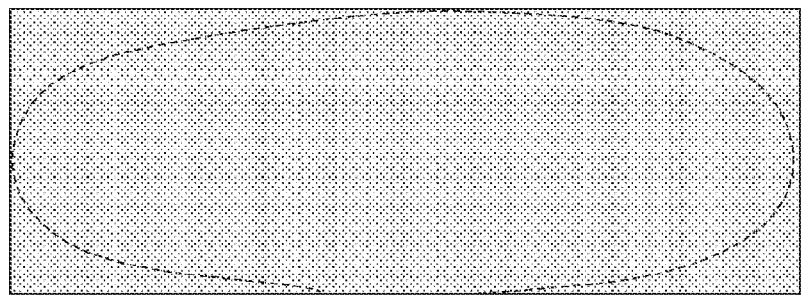
FIG. 18 illustrates an example in which a hiding subject region specified by the specifying method shown in FIG. 7 is hidden.
Figure 19:
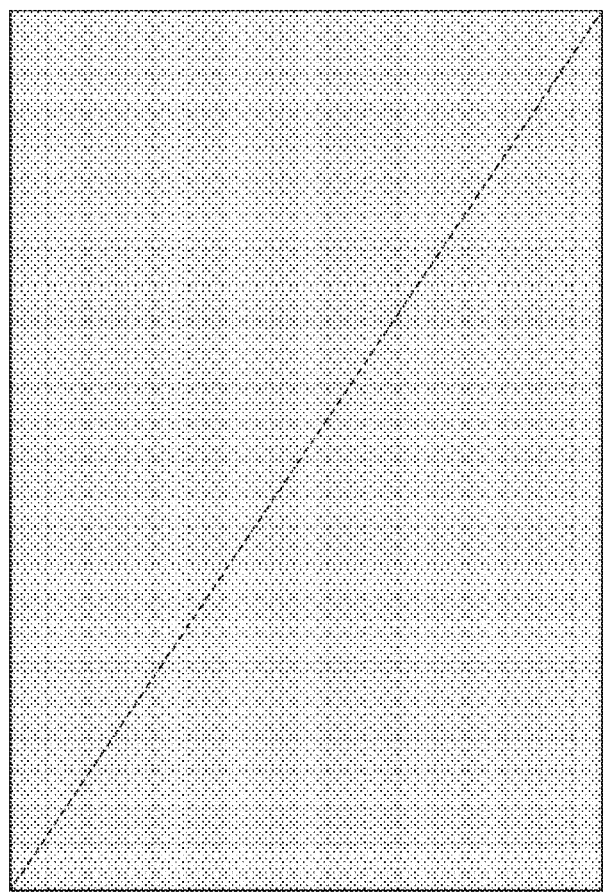
FIG. 19 illustrates an example in which a hiding subject region specified by the specifying method shown in FIG. 9 is hidden.

In step 124 shown in FIG. 10, a hiding subject region is specified by using a specifying method which is uniquely determined for the specifying mark information stored in the RAM 10B in step 120 or 122. Then, in step 126, a processing subject image obtained by hiding the hiding subject region specified in step 124 by using a hiding method which is uniquely determined for the specifying method employed in step 124 is displayed on the display unit 10F. An example of the hiding method uniquely determined for the specifying method which is uniquely determined for segment mark information is hiding a specified hiding subject region by filling the entire region within the circumscribed rectangular frame 50 with a solid color. By using this method, the specified hiding subject region is hidden, for example, as shown in FIG. 16. An example of the hiding method uniquely determined for the specifying method which is uniquely determined for polygonal-frame mark information is hiding a specified hiding subject region by filling a region (in this case, the entire region) surrounded by a contour of an image corresponding to a polygonal frame mark with a solid color. By using this method, the specified hiding subject region is hidden, for example, as shown in FIG. 17. An example of the hiding method uniquely determined for the specifying method which is uniquely determined for curved-frame mark information is hiding a specified hiding subject region by filling the entire region within the circumscribed rectangular frame 54 with a solid color. By using this method, the specified hiding subject region is hidden, for example, as shown in FIG. 18. In the example shown in FIG. 18, although the curved broken line is shown, this is merely for illustrating a rough image of the curved frame mark and is not actually displayed. An example of the hiding method uniquely determined for the specifying method which is uniquely determined for oblique-line mark information is hiding a specified hiding subject region by filling the entire region within a circumscribed rectangular frame corresponding to an oblique line mark with a solid color. By using this method, the specified hiding subject region is hidden, for example, as shown in FIG. 19. In the example shown in FIG. 19, although the oblique broken line is shown, this is merely for illustrating a rough image of the oblique line mark and is not actually displayed.

In step 126, an image subjected to hiding processing is displayed on the display unit 10F. However, if a printer is connected to the image processing apparatus 10, an image subjected to hiding processing may be recorded on a recording medium, e.g., paper, by using the printer. Alternatively, image information representing an image subjected to hiding processing may be stored in the secondary storage unit 10D, or it may be transmitted to an external device and be stored in a storage unit, e.g., a hard disk drive, of the external device.

In step 128, it is determined whether steps 110 through 126 have been executed on all the marker portions separated from the processing subject image in step 108. If the result of step 128 is NO, the process returns to step 110. If the result of step 128 is YES, the hiding processing program is completed.

As has been described above in detail, by using the image processing apparatus 10 of the first exemplary embodiment, the CPU 10A executes the hiding processing program so as to perform high-precision hiding processing in the following manner. Predetermined plural types of specifying marks may be recorded in a recording area indicated by a processing subject image by using an attribute different from that of the processing subject image so as to specify a hiding subject region within the processing subject image by using different specifying methods. At least one of such plural types of specifying marks is recorded in the recording area. Then, images corresponding to the recorded specifying mark are extracted on the basis of the attribute of the recorded specifying mark. Subsequently, a circumscribed frame is formed for a processing subject marker image, which is a subject image corresponding to the specifying mark among the extracted images corresponding to the specifying mark. Then, a contained frame which is uniquely determined for the formed circumscribed frame is formed. Then, the type of specifying mark corresponding to the processing subject marker image is estimated on the basis of the percentage of the image corresponding to the specifying mark in the contained frame. By using this estimation method, compared with a known method (e.g., a method for specifying a hiding subject region by using only one type of specifying mark), a region intended as a hiding subject region is specified with high precision. Accordingly, it is possible to perform hiding processing on a region intended as a hiding subject region with high precision, compared with a configuration of the related art.

In the first exemplary embodiment, an oblique line is used as an identification mark included in a polygonal frame mark. In this case, the oblique line may be wrongly recognized as an oblique line mark. However, even if the oblique line as an identification mark is recognized as an oblique line mark, it does not mean that an intended hiding subject region is not hidden. The reason for this is as follows. Assume that an oblique line as an identification mark is recognized as an oblique line mark, and that a circumscribed rectangular frame is formed for the oblique line as described above, and that the entire region within the formed circumscribed rectangular frame is hidden. This also means that a region within a polygonal frame mark (a region within an intended hiding subject region specified by using a polygonal frame mark) is hidden. Thus, in this case, the entire region surrounded by the polygonal frame mark is hidden, which covers a portion which is not hidden by a circumscribed rectangular frame set for the oblique line as the identification mark.

Additionally, although in the first exemplary embodiment an oblique line is used as an identification mark, the identification mark may be represented by another type of mark, such as a sign Δ or #, and particularly, a continuous segment image having a specific color is preferable. Any sign may be used as the identification mark as long as a polygonal frame mark can be distinguished from other specifying marks.

In the first exemplary embodiment, the image processing apparatus 10 has the hiding processing function. However, instead of the image processing apparatus 10, the image reading apparatus 11 may have the hiding processing function. In this case, the above-described hiding processing program may be executed on a computer that controls the image reading apparatus 11.

In the first exemplary embodiment, an image already recorded on a recording area of a document P is hidden. However, an image to be hidden does not have to be recorded in a recording area of a document P. That is, a region within a recording area of a white document P may be specified, and hiding processing (e.g., filling the region with a solid color or shading the region) may be performed on the specified region.

Second Exemplary Embodiment

In the first exemplary embodiment, a determination as to whether a specifying mark corresponding to a processing subject marker image is an oblique line mark is made by finding a tilting approximate degree. However, the above-described determination may be made in a different manner. This will be described in detail in a second exemplary embodiment. In the following description, the same elements and configurations as those of the first exemplary embodiment are designated by like reference numerals, and an explanation thereof will thus be omitted.

Figure 20:
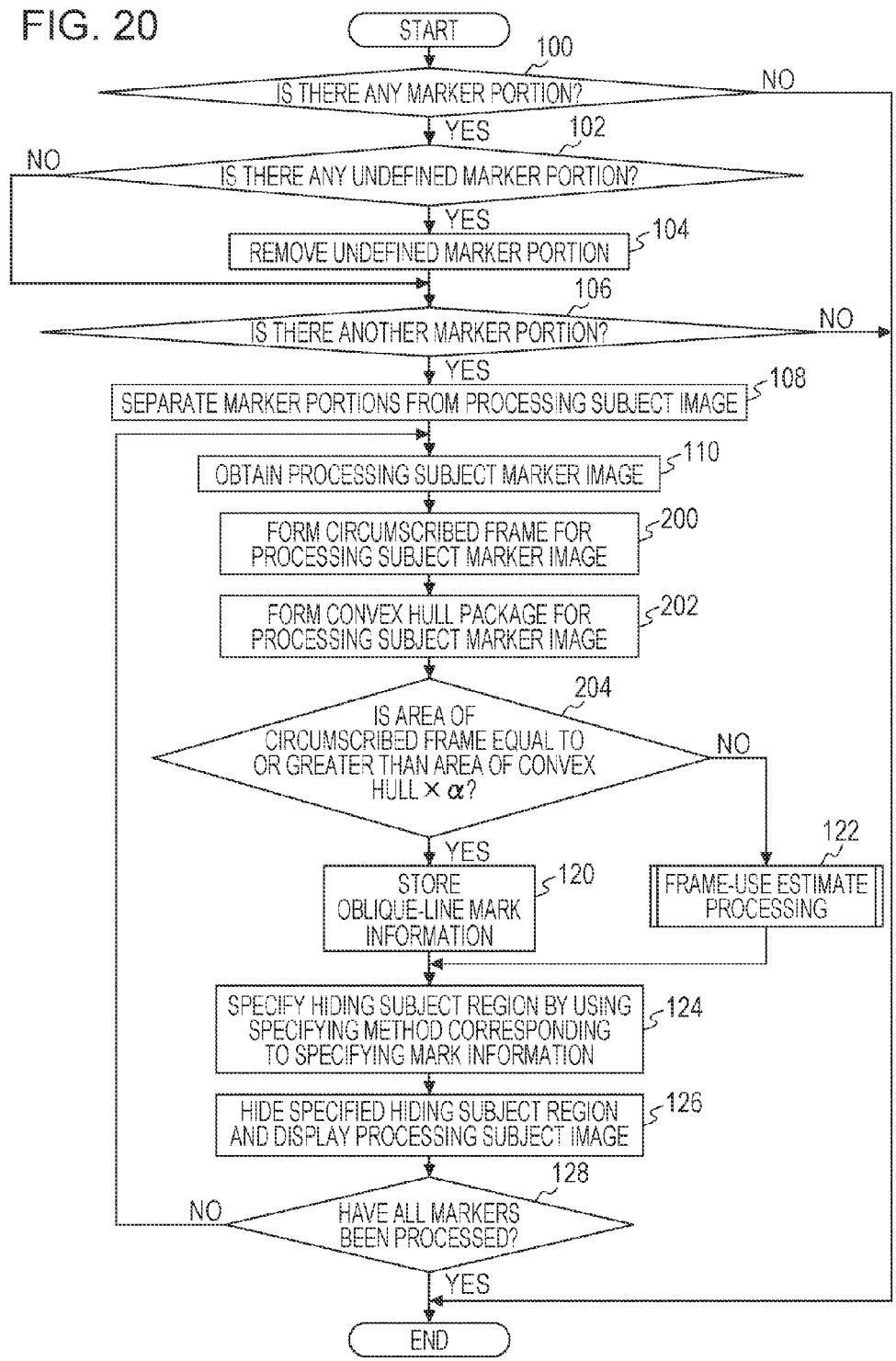
FIG. 20 is a flowchart illustrating an example of the flow of processing of a hiding processing program according to a second exemplary embodiment.

FIG. 20 is a flowchart illustrating the flow of processing of a hiding processing program according to a second exemplary embodiment. The flowchart of FIG. 20 is different from that of FIG. 10 in that steps 200 and 202 are used instead of steps 112, 114, and 116 and step 204 is used instead of step 118.

In step 200, a circumscribed frame is formed for a processing subject marker image, and then, the process proceeds to step 202. In the second exemplary embodiment, by executing step 200, as a circumscribed frame, the circumscribed rectangular frame 50 shown in FIG. 13 is formed for a processing subject marker image corresponding to a segment mark, the circumscribed rectangular frame 52 shown in FIG. 14 is formed for a processing subject marker image corresponding to a polygonal frame mark, and the circumscribed rectangular frame 54 shown in FIG. 15 is formed for a processing subject marker image corresponding to a curved frame mark. Although in these examples the circumscribed rectangular frames 50, 52, and 54 are illustrated by way of example, a circumscribed curved shape or another type of polygonal frame other than a rectangular frame may be formed.

Figure 21:
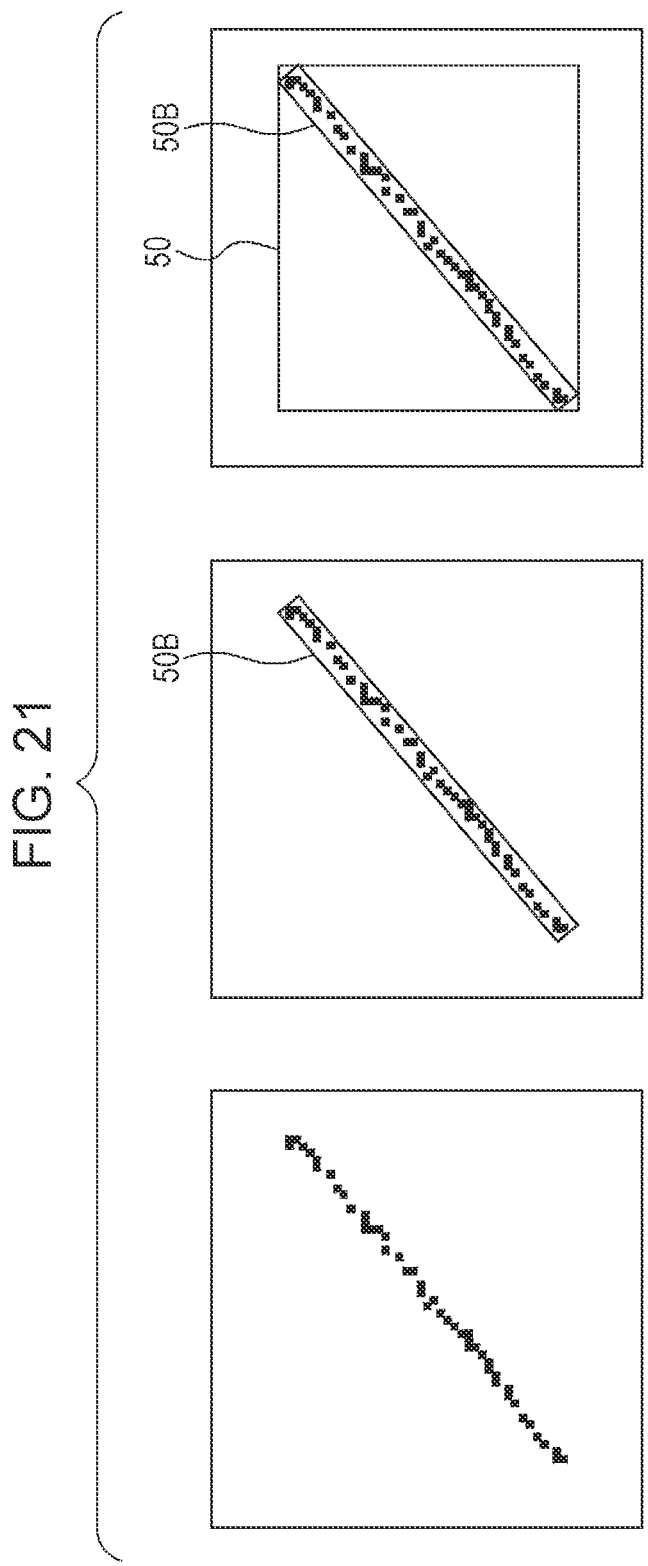
FIG. 21 schematically illustrates an example of a convex hull set for an oblique line mark which is used for executing hiding processing by using the image processing apparatus according to the second exemplary embodiment.
Figure 22:
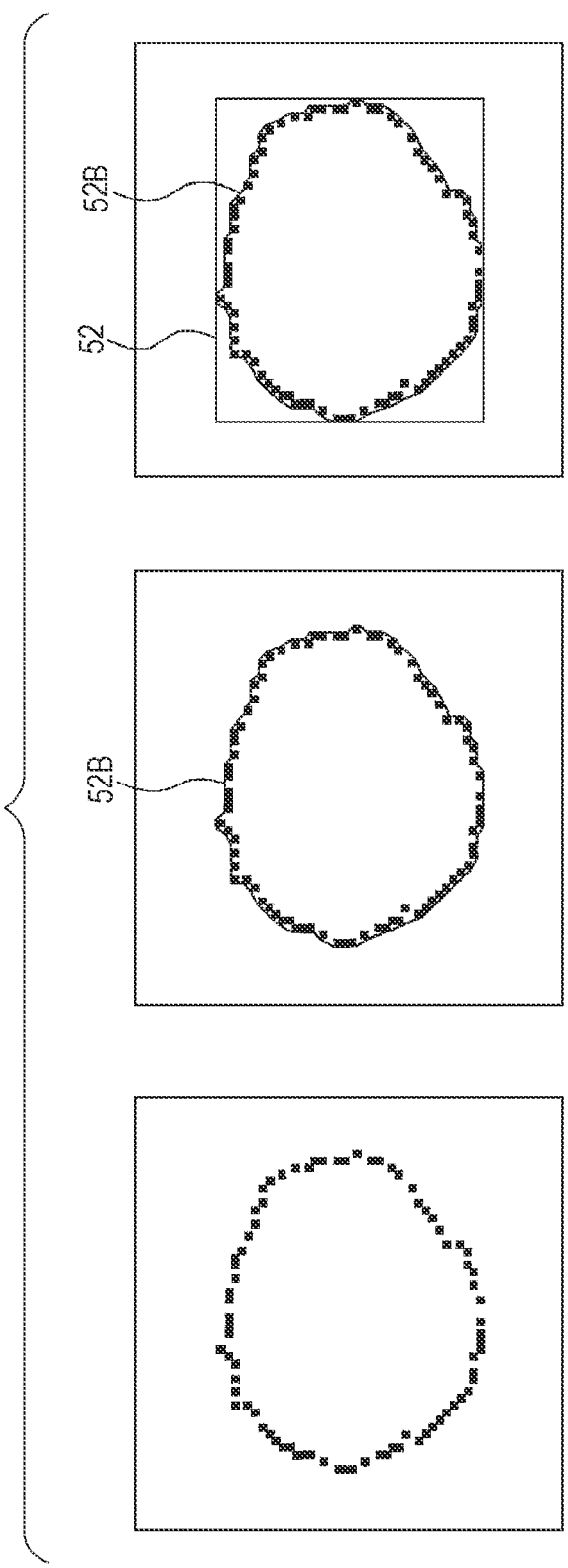
FIG. 22 schematically illustrates an example of a convex hull set for a curved frame mark which is used for executing hiding processing by using the image processing apparatus according to the second exemplary embodiment.
Figure 23:
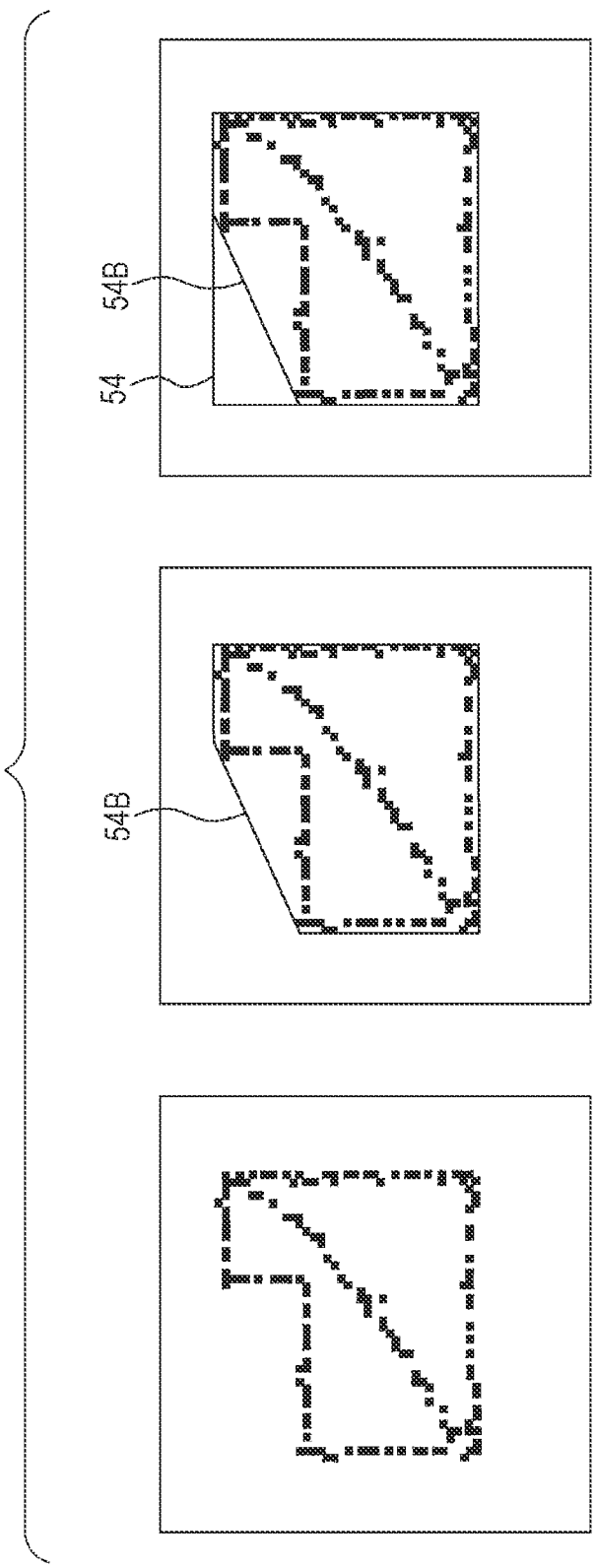
FIG. 23 schematically illustrates an example of a convex hull set for a polygonal frame mark which is used for executing hiding processing by using the image processing apparatus according to the second exemplary embodiment.

In step 202, a convex hull is formed for the processing subject marker image, and the process proceeds to step 204. The convex hull is a segment set formed by connecting points positioned most outwardly among the points of a point set by using a straight line. In the second exemplary embodiment, by executing step 202, as a convex hull, a convex hull 50B shown in FIG. 21 is formed for a processing subject marker image corresponding to a segment mark, a convex hull 52B shown in FIG. 22 is formed for a processing subject marker image corresponding to a curved frame mark, and a convex hull 54B shown in FIG. 23 is formed for a processing subject marker image corresponding to a polygonal frame mark.

In step 204, it is determined whether the percentage of the convex hull formed in step 202 in the circumscribed frame formed in step 200 is equal to or greater than a threshold obtained by multiplying the area of the convex hull by a predetermined coefficient (oblique-line determining threshold). If the result of step 204 is YES, the process proceeds to step 120. If the result of step 204 is NO, the process proceeds to step 122. The above-described determination does not have to be made on the basis of the above-described threshold. Alternatively, if the relationship "the area of the circumscribed frame≥the area of the convex hull×300" is established, the above-described determination may be determined as positive, and if this relationship is not established, the above-described determination may be determined as negative. In step 204, although the oblique-line determining threshold is variable in accordance with the area of the convex hull, it may be a fixed value which is uniquely assigned for each specifying mark.

As has been discussed above in detail, by using the image processing apparatus 10 of the second exemplary embodiment, the CPU 10A executes the hiding processing program so as to perform high-precision hiding processing in the following manner. A convex hull is formed for a processing subject marker image. Then, if the percentage of the convex hull in a circumscribed rectangular frame formed for an image corresponding to the processing subject marker image is equal to or greater than the oblique-line determining threshold, a specifying mark corresponding to the processing subject marker image is determined as an oblique line mark. If the percentage of the convex hull in the circumscribed rectangular frame is smaller than the oblique-line determining threshold, a specifying mark corresponding to the processing subject marker image is determined as a specifying mark other than an oblique line mark, i.e., a segment mark, a polygonal frame mark, or a curved frame mark. Accordingly, it is possible to estimate with high precision whether an oblique line mark is recorded in a recording area (whether a hiding subject region is specified by using an oblique line mark), compared with a configuration of the related art.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an estimating unit configured to:
extract a subject specifying mark image corresponding to a specifying mark from a recording area image corresponding to a recording area in which an image is recorded, a plurality of predetermined types of specifying marks having predetermined attributes different from an attribute of the image of the recording area and being used for specifying a region within the recording area by using different specifying methods, at least one of the plurality of predetermined types of specifying marks being recorded in the recording area; and
estimate the type of specifying mark corresponding to the extracted subject specifying mark image; and
a hiding unit configured to hide the region specified by the type of specifying mark estimated by the estimating unit by using a hiding method which is uniquely determined for the estimated type of specifying mark.

2. The image processing apparatus according to claim 1, wherein the plurality of predetermined types of specifying marks include at least two from among a segment mark, a curved frame mark, and a polygonal frame mark, the segment mark indicating, as the specified region, a region surrounded by a frame corresponding to a circumscribed rectangular frame formed for a region which is filled with a solid color as a result of recording the segment mark in the recording area, the curved frame mark indicating, as the specified region, a region surrounded by a frame corresponding to a circumscribed rectangular frame formed for a region which is surrounded as a result of recording the curved frame mark in the recording area, the polygonal frame mark indicating, as the specified region, a region contained in a region which is surrounded as a result of recording the polygonal frame mark in the recording area.

3. The image processing apparatus according to claim 1, further comprising:
an extracting unit configured to extract specifying mark images from the recording area image on the basis of the attributes; and
a forming unit configured to form a contained frame which is uniquely determined for a circumscribed frame formed for a subject specifying mark image among the specifying mark images extracted by the extracting unit and which is contained within the circumscribed frame without contacting the circumscribed frame,
wherein the estimating unit estimates the type of specifying mark corresponding to the subject specifying mark image on the basis of the percentage of the subject specifying mark image in the contained frame formed by the forming unit.

4. A specifying mark estimating apparatus comprising:
an extracting unit configured to extract a subject specifying mark image corresponding to a specifying mark from a recording area image corresponding to a recording area in which an image is recorded, a plurality of predetermined types of specifying marks having predetermined attributes different from an attribute of the image of the recording area and being used for specifying a region within the recording area by using different specifying methods, at least one of the plurality of predetermined types of specifying marks being recorded in the recording area, the plurality of predetermined types of specifying marks including at least two from among a segment mark, a curved frame mark, and a polygonal frame mark, the segment mark indicating, as the specified region, a region surrounded by a frame corresponding to a circumscribed rectangular frame formed for a region which is filled with a solid color as a result of recording the segment mark in the recording area, the curved frame mark indicating, as the specified region, a region surrounded by a frame corresponding to a circumscribed rectangular frame formed for a region which is surrounded as a result of recording the curved frame mark in the recording area, the polygonal frame mark indicating, as the specified region, a region contained in a region which is surrounded as a result of recording the polygonal frame mark in the recording area; and an estimating unit configured to estimate the type of specifying mark corresponding to the subject specifying mark image extracted by the extracting unit.

5. The specifying mark estimating apparatus according to claim 4, wherein the extracting unit is configured to extract specifying mark images from the recording area image on the basis of the attributes;

the specifying mark estimating apparatus further comprises a forming unit configured to form a contained frame which is uniquely determined for a circumscribed frame formed for a subject specifying mark image among the specifying mark images extracted by the extracting unit and which is contained within the circumscribed frame without contacting the circumscribed frame, wherein the estimating unit is configured to estimate the type of specifying mark corresponding to the subject specifying mark image on the basis of the percentage of the subject specifying mark image in the contained frame formed by the forming unit.

6. The specifying mark estimating apparatus according to claim 5, wherein the forming unit is configured to form the contained frame at a position of a central portion of the circumscribed frame.

7. The specifying mark estimating apparatus according to claim 4, wherein the specifying mark images are different continuous segment images having a specific color.

8. The specifying mark estimating apparatus according to claim 4, wherein the polygonal frame mark contains an identification mark indicating that the polygonal frame mark is a specifying mark different from other specifying marks.

9. The specifying mark estimating apparatus according to claim 4, wherein one of the plurality of predetermined types of specifying marks is an oblique line mark which corresponds to one of diagonal lines defining a rectangular frame and which indicates, as the specified region, a region surrounded by the rectangular frame;

the specifying mark estimating apparatus further comprises:

a segmenting unit configured to segment a line corresponding to a contour of the subject specifying mark image extracted by the extracting unit in units of segmentations having a predetermined length; and a calculating unit configured to calculate a sum of approximate degrees between an angle of each of segments obtained by segmenting the line by the segmenting unit with respect to a predetermined reference line and an angle of a predetermined reference tilting line with respect to the predetermined reference line, wherein, in response to the sum calculated by the calculating unit being equal to or greater than a threshold, the estimating unit estimates that the type of specifying mark corresponding to the subject specifying mark image is an oblique line mark, and in response to the sum calculated by the calculating unit being smaller than the threshold, the estimating unit estimates that the type of specifying mark corresponding to the subject specifying mark image is a specifying mark other than the oblique line mark.

10. The specifying mark estimating apparatus according to claim 4, wherein one of the plurality of predetermined types of specifying marks is an oblique line mark which corresponds to one of diagonal lines defining a rectangular frame and which indicates, as the specified region, a region surrounded by the rectangular frame;

the specifying mark estimating apparatus further comprises a convex hull forming unit configured to form a convex hull formed for the subject specifying mark image extracted by the extracting unit, wherein, in response to the percentage of the convex hull in a circumscribed rectangular frame formed for the subject specifying mark image extracted by the extracting unit being equal to or greater than a threshold, the estimating unit estimates that the type of specifying mark corresponding to the subject specifying mark image is an oblique line mark, and in response to the percentage being smaller than the threshold, the estimating unit estimates that the type of specifying mark corresponding to the subject specifying mark image is a specifying mark other than the oblique line mark.

11. An image processing method comprising:

extracting a subject specifying mark image corresponding to a specifying mark from a recording area image corresponding to a recording area in which an image is recorded, a plurality of predetermined types of specifying marks having predetermined attributes different from an attribute of the image of the recording area and being used for specifying a region within the recording area by using different specifying methods, at least one of the plurality of predetermined types of specifying marks being recorded in the recording area, and estimating the type of specifying mark corresponding to the extracted subject specifying mark image; and hiding the region specified by the estimated type of specifying mark by using a hiding method which is uniquely determined for the estimated type of specifying mark.

12. A specifying mark estimating method comprising:

extracting a subject specifying mark image corresponding to a specifying mark from a recording area image corresponding to a recording area in which an image is recorded, a plurality of predetermined types of specifying marks having predetermined attributes different from an attribute of the image of the recording area and being used for specifying a region within the recording area by using different specifying methods, at least one of the plurality of predetermined types of specifying marks being recorded in the recording area, the plurality of predetermined types of specifying marks including at least two from among a segment mark, a curved frame mark, and a polygonal frame mark, the segment mark indicating, as the specified region, a region surrounded by a frame corresponding to a circumscribed rectangular frame formed for a region which is filled with a solid color as a result of recording the segment mark in the recording area, the curved frame mark indicating, as the specified region, a region surrounded by a frame corresponding to a circumscribed rectangular frame formed for a region which is surrounded as a result of recording the curved frame mark in the recording area, the polygonal frame mark indicating, as the specified region, a region contained in a region which is surrounded as a result of recording the polygonal frame mark in the recording area; and estimating the type of specifying mark corresponding to the extracted subject specifying mark image.

13. A non-transitory computer readable medium storing a program causing a computer to execute the specifying mark estimating method of claim 12.

14. A non-transitory computer readable medium storing a program causing a computer to execute a process, the process comprising:

extracting a subject specifying mark image corresponding to a specifying mark from a recording area image corresponding to a recording area in which an image is recorded, a plurality of predetermined types of specifying marks having predetermined attributes different from an attribute of the image of the recording area and being used for specifying a region within the recording area by using different specifying methods, at least one of the plurality of predetermined types of specifying marks being recorded in the recording area, and estimating the type of specifying mark corresponding to the extracted subject specifying mark image; and hiding the region specified by the estimated type of specifying mark by using a hiding method which is uniquely determined for the estimated type of specifying mark.

15. An image processing apparatus comprising:

an extraction unit configured to extract an image of a specifying mark from a document;

an estimating unit configured to estimate, from among a plurality of different types of specifying marks, a type of specifying mark that corresponds to the image of the specifying mark extracted from the document; and a hiding unit configured to hide a region of the document, which is specified by the image of the specifying mark extracted from the document, by using a hiding method that is uniquely associated with the estimated type of specifying mark.

* * * * *